United States Patent
Gu

(10) Patent No.: US 11,468,703 B2
(45) Date of Patent: Oct. 11, 2022

(54) METHOD, STORAGE MEDIA AND DEVICE FOR BIOMETRIC IDENTIFICATION DRIVING

(71) Applicant: SHANGHAI HARVEST INTELLIGENCE TECHNOLOGY CO., LTD, Shanghai (CN)

(72) Inventor: Fengjun Gu, Shanghai (CN)

(*) Notice: Subject to any disclaimer, the term of this patent is extended or adjusted under 35 U.S.C. 154(b) by 0 days.

(21) Appl. No.: 16/699,736

(22) Filed: Dec. 2, 2019

(65) Prior Publication Data
US 2020/0184180 A1 Jun. 11, 2020

(30) Foreign Application Priority Data
Nov. 30, 2018 (CN) .......................... 201811457962.4

(51) Int. Cl.
*G06F 3/041* (2006.01)
*G06V 40/13* (2022.01)
*G06V 10/22* (2022.01)
*G06V 10/141* (2022.01)

(52) U.S. Cl.
CPC .......... *G06V 40/1318* (2022.01); *G06F 3/041* (2013.01); *G06V 10/141* (2022.01); *G06V 10/22* (2022.01)

(58) Field of Classification Search
CPC .. G06K 9/0004; G06K 9/2027; G06K 9/2054; G06K 9/2081; G06K 9/00973; G06F 3/041; G06F 1/325; G06V 40/1318; G06V 10/141; G06V 10/22; G06V 10/235; G06V 10/94
See application file for complete search history.

(56) References Cited

U.S. PATENT DOCUMENTS

| | | | |
|---|---|---|---|
| 9,383,887 B1* | 7/2016 | Khafizov | G06F 3/0481 |
| 10,157,590 B1* | 12/2018 | Aflatooni | G06K 9/00013 |
| 2018/0204043 A1* | 7/2018 | Yang | G06K 9/00087 |
| 2019/0354226 A1* | 11/2019 | Choi | G06F 3/041 |
| 2020/0160025 A1* | 5/2020 | Dangy-Caye | G06K 9/00087 |

* cited by examiner

*Primary Examiner* — Patrick N Edouard
*Assistant Examiner* — Joseph P Fox

(57) ABSTRACT

A method, storage media and device for biometric identification driving is provided. The method for biometric identification driving includes the steps. First, a touch action of a living organism is detected on a screen. Next, a position information of the touch action is obtained on the screen. Next, a scanning data of a corresponding biometric scanning unit of the screen is obtained according to the position information of the touch action on the screen. the above technical solution could effectively utilize existing screen detection mechanisms. Pre-detection steps is performed before detecting a fingerprint. A relative position of the fingerprint on the screen is obtained according to the existing screen detection mechanism. Thus, the biometric scanning unit or a fingerprint scanning unit detected by the relative position is effective. Finally, an effective scanning result of the biometric scanning unit is obtained.

8 Claims, 5 Drawing Sheets

METHOD, STORAGE MEDIA AND DEVICE FOR BIOMETRIC IDENTIFICATION DRIVING

FIELD OF THE DISCLOSURE

The present disclosure relates to a technical field of biometric feature identifying, more particularly to a driving method and device relating a biometric optical imaging.

BACKGROUND OF THE INVENTION

With a development of information technology, biometric feature identifying technology has become more and more important in ensuring information security. Fingerprint recognition has become one of the key technical means of identity recognition and device unlocking widely used in the mobile Internet field. With the increasing screen ratio of devices, the traditional capacitive fingerprint recognition can no longer meet the needs. However, ultrasonic fingerprint recognition has problems with technical maturity and cost, so an optical fingerprint recognition will become the mainstream technical solution for fingerprint recognition of the screen.

Currently, an optical fingerprint recognition scheme is full-screen scanning of fingerprint touch when sensing a touch. Row-by-row or column-by-column, collection of optical fingerprint image information on the entire screen. Such a scheme will undoubtedly increase the workload of full-screen scanning and the good points of the entire system. The acquired extra images will also increase the transmission of useless information on the entire system, occupying bandwidth and making information processing difficult.

SUMMARY OF THE INVENTION

Therefore, providing an interaction based on the touch information sensed on a screen and a specific drive or recognition record based on the perceived results is needed.

To achieve the above object, a method for biometric identification driving is provided to detect a touch action of a living organism on a screen and to obtain a position information of the touch action on the screen. A scanning data of a corresponding biometric scanning unit of the screen is obtained according to the position information of the touch action on the screen.

In some embodiment, the method for biometric identification driving further includes driving the corresponding biometric scanning unit of the screen according to the position information of the touch action on the screen.

In some embodiment, the method for biometric identification driving further includes driving the corresponding biometric scanning unit of the screen in order.

In some embodiment, the biometric scanning unit includes a light emitting component, a photosensitive component and a drive circuit.

In some embodiment, the biometric scanning unit corresponding to rows of the screen is driven independently, and the method for biometric identification driving further includes driving the biometric scanning unit of the screen corresponding to a row according to the position information of the touch action on the screen.

In some embodiment, the biometric scanning unit corresponding to columns of the screen is driven independently, and the method for biometric identification driving further includes driving the biometric scanning unit of the screen corresponding to a column according to the position information of the touch action on the screen.

In some embodiment, the method for biometric identification driving further includes discarding a non-corresponding biometric scan result according to the position information of the touch action on the screen.

A storage media for biometric identification driving is provided, and the storage media for biometric identification driving stores a computer program. The computer program performs the following steps when the computer program is executed. First, a touch action of a living organism is detected on a screen. Next, a position information of the touch action is obtained on the screen. Next, a scanning data of a corresponding biometric scanning unit of the screen is obtained according to the position information of the touch action on the screen.

In some embodiment, when the computer program is executed, the computer program further performs the step of driving the corresponding biometric scanning unit of the screen according to the position information of the touch action on the screen.

In some embodiment, when the computer program is executed, the computer program further performs the step of driving the corresponding biometric scanning unit of the screen in order.

In some embodiment, the biometric scanning unit corresponding to rows of the screen is driven independently, and when the computer program is executed, the computer program further performs the step of driving the biometric scanning unit of the screen corresponding to a row according to the position information of the touch action on the screen.

In some embodiment, the biometric scanning unit corresponding to columns of the screen is driven independently, and when the computer program is executed, the computer program further performs the step of driving the biometric scanning unit of the screen corresponding to a column according to the position information of the touch action on the screen.

In some embodiment, when the computer program is executed, the computer program further performs the step of discarding a non-corresponding biometric scan result according to the position information of the touch action on the screen.

A device for biometric identification driving is provided, and the device for biometric identification driving includes a screen, a biometric scanning unit and the above storage media for biometric identification driving.

In some embodiment, when the computer program stored by the storage media for biometric identification driving is executed, the computer program further performs the step of discarding a non-corresponding biometric scan result according to the position information of the touch action on the screen. Compared to existing technology, the above technical solution could effectively utilize existing screen detection mechanisms. Pre-detection steps are performed before detecting a fingerprint. A relative position of the fingerprint on the screen is obtained according to the existing screen detection mechanism. Thus, the biometric scanning unit or a fingerprint scanning unit detected by the relative position is effective. Finally, an effective scanning result of the biometric scanning unit is obtained. The above technical solution can reduce the subsequent driving consumption of the biometric scanning unit and improve the processing efficiency of the scanning result.

DESCRIPTION OF THE PREFERRED EMBODIMENTS

In order to explain the technical content, structural features, achieved objectives, and effects of the technical solution in detail, specific embodiments are described below in conjunction with drawings.

Figure 1:
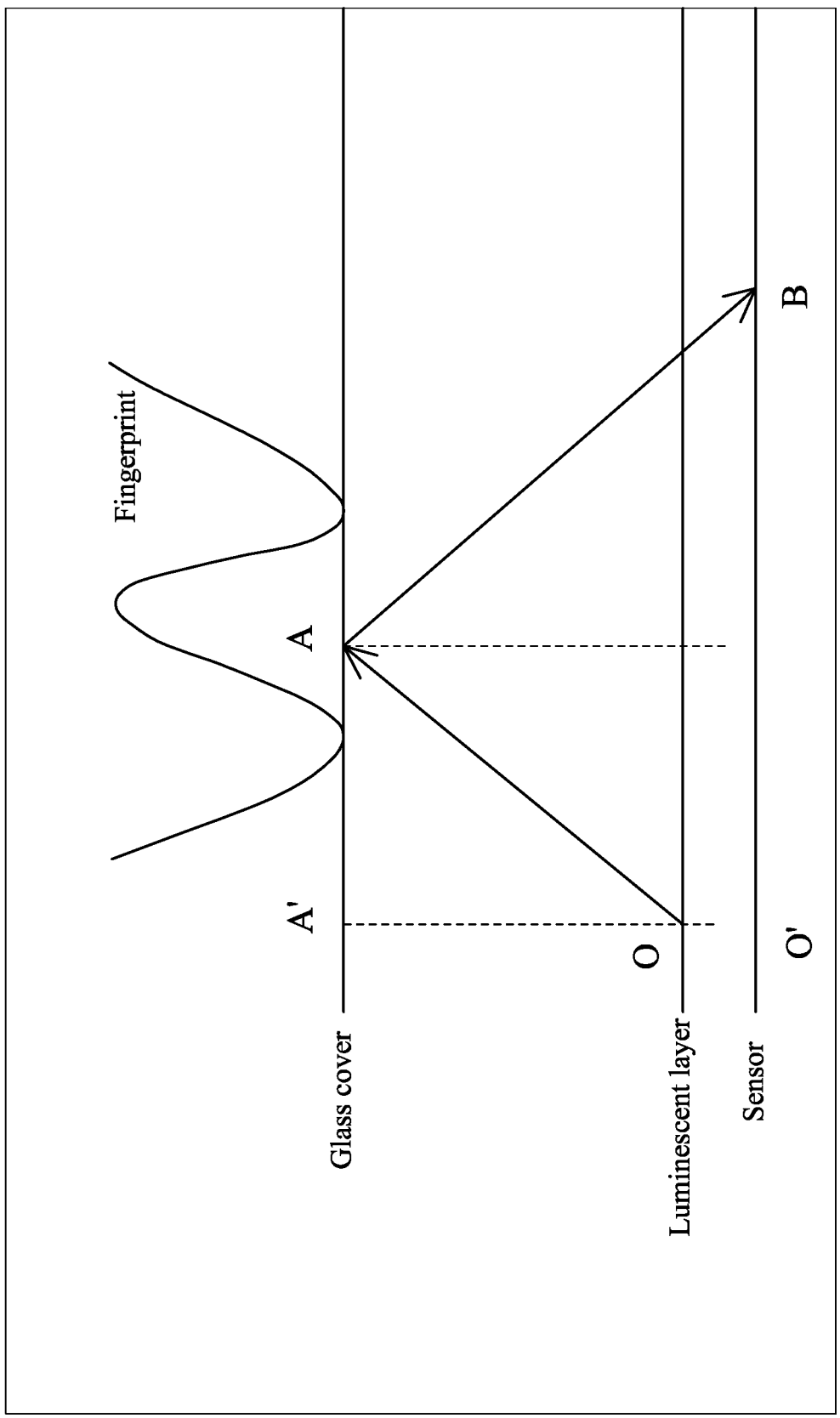
FIG. 1 illustrates an architecture diagram of a biometric scanning unit with an embodiment of the present disclosure.
Figure 2:
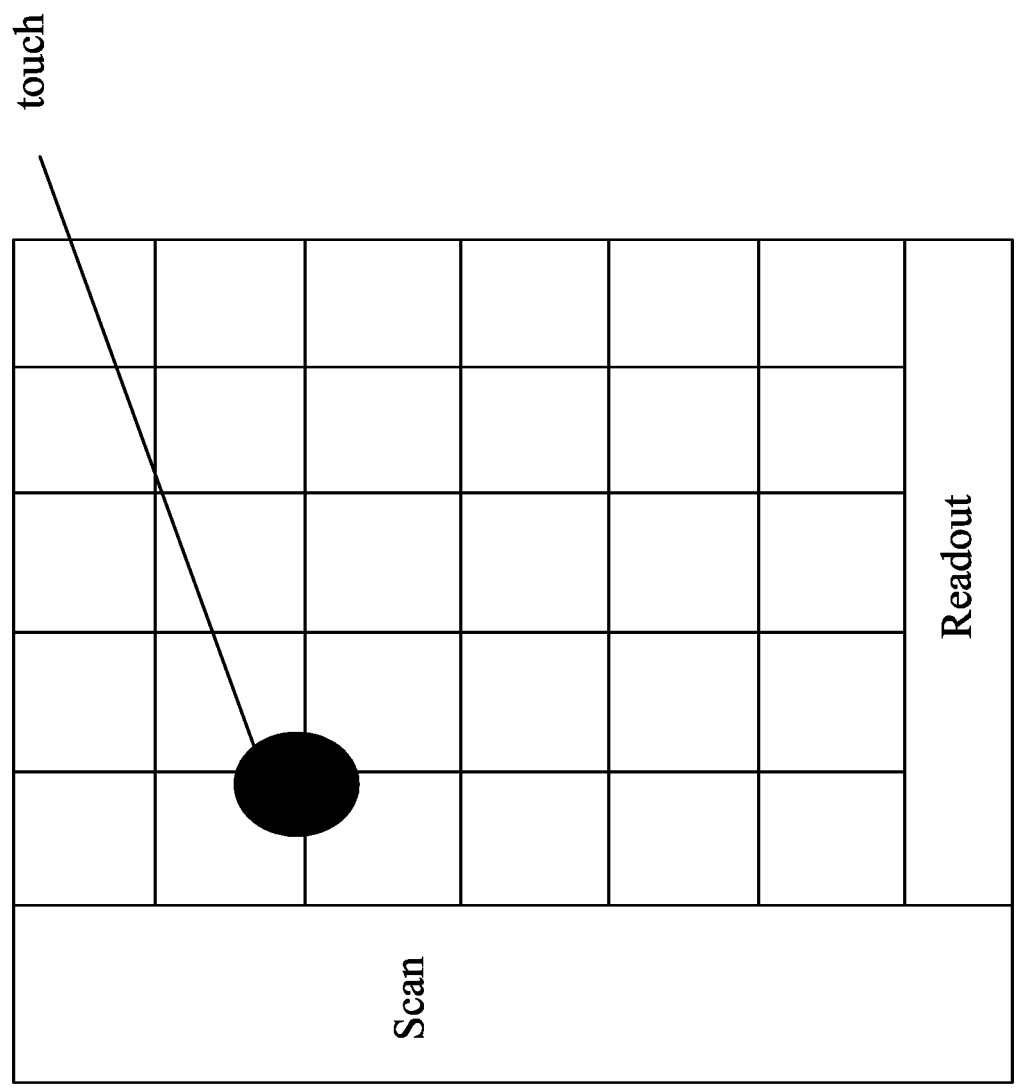
FIG. 2 illustrates a detection diagram of a touch action with an embodiment of the present disclosure; structural diagram of lens less optical imaging.

The object of the present disclosure is achieved by the following technical solutions:

Please refer to FIG. 1. FIG. 1 illustrates an architecture diagram of a biometric scanning unit with an embodiment of the present disclosure. The biometric scanning unit includes a light emitting component and a photosensitive component. The light emitting component is placed in a luminescent layer of FIG. 1. The photosensitive component could be placed in a sensor layer. Specific settings can refer to our other related patent schemes. The light emitted by the light emitting component after total reflection can leave an image in the photosensitive component of the sensor layer of the screen. The screen means a common screen. Taking the screen of a mobile phone as an example, the screen may be a 4.7-inch screen, a 5.1-inch screen, a 5.4-inch screen, etc. By deploying a plurality of biometric scanning units, any range of the entire screen can obtain a scanning data by the above biometric scanning units without consuming too much energy. The above biometric is as fingerprints as an example. If the fingerprints are replaced with other biometric such as palm prints, footprints, toe prints, retinas and iris, it can also be clearly realized. In a specific embodiment, as shown in FIG. 2, the circle in the FIG. 2 shows a touch position of a living organism in full screen. The circle is concentrated at the upper left position in FIG. 2. Thus, in an ideal state, we only need to extract an optical imaging results of the biometric scanning unit corresponding to a position of the circle.

Figure 3:
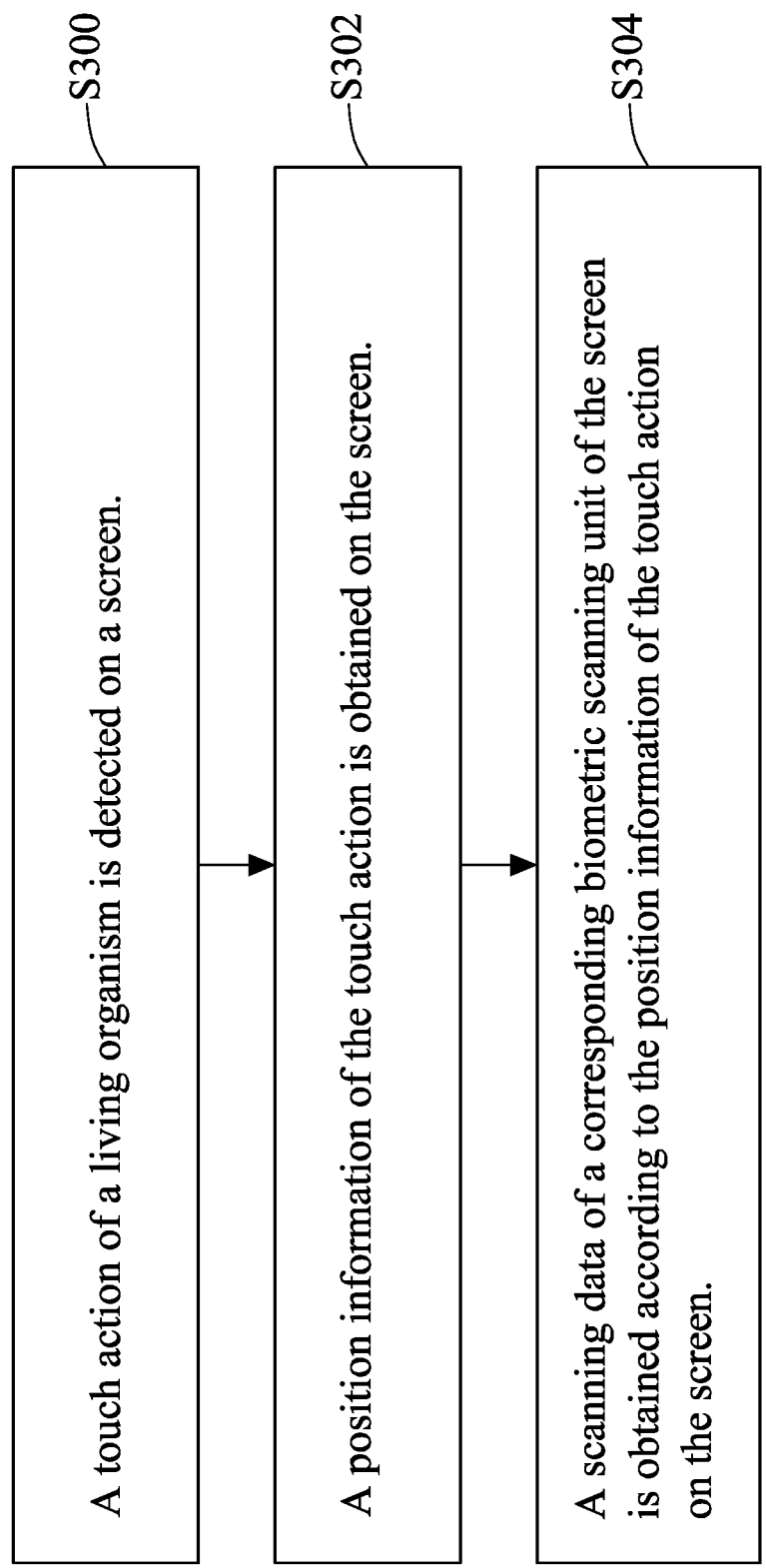
FIG. 3 illustrates a flowchart of a method for biometric identification driving with an embodiment of the present disclosure.

In the embodiment shown in FIG. 3, a method for biometric identification driving is provided. The method for biometric identification driving includes the following steps: In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. In a specific embodiment, we can divide an area range according to a specific effective range of the biometric scanning unit. In the embodiment shown in FIG. 2, each grid means having a corresponding biometric scanning unit below it. When the first row and the second row are touched, it is equivalent to an area of a coordinates (1, 2) has detected the touch action. Thus, scanning data of the biometric scanning unit corresponding to the area needs to be obtained. In another embodiment, coordinates of the screen can be more finely divided. There is not a one-to-one correspondence between the divided area and the biometric scanning unit. It may be that a plurality of areas corresponds to one biometric scanning unit, or the coordinates of the screen are more roughly divided. There is not a one-to-one correspondence between the divided area and the biometric scanning unit. It may be that one area corresponds to a plurality of biometric scanning units. Just need to know that the scanning data of the corresponding biometric scanning unit can be obtained by the area corresponding to the touch action.

In some embodiments, the biometric scanning unit further includes a drive circuit. The drive circuit is configured to drive the light emitting component and the photosensitive component of the biometric scanning unit. In general, to obtain a scan result, the biometric scanning unit that obtains the scan data needs to perform the following steps:

1) The drive circuit of the corresponding biometric scanning unit is driven for driving the light emitting component and the photosensitive component;
2) The photosensitive component receives a reflected light signal to obtain a photosensitive image;
3) The photosensitive image obtained is as the scan result, and the photosensitive image is stored in a storage unit.

In this way, the scanning result of the biometric scanning unit corresponding to or relating to the area touched is obtained. In the case where a range of the touch action is less than a range of the full screen, we don't need to do the above operation for all biometric units. We can perform all the steps for the corresponding biometric scanning unit in order to obtain the scan data of the corresponding biometric scanning unit of the screen. In addition, depending on the situation, it is not necessary to perform step 1) or step 2) or step 3) on other non-corresponding biometric scanning units of the screen.

In some embodiments of the present disclosure performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) All drive circuits of the corresponding biometric scanning unit are driven for driving the light emitting component and the photosensitive component;
2) The photosensitive component receives a reflected light signal to obtain a photosensitive image;
3) In accordance with the position information, the photosensitive image or the scanning result obtained by the non-corresponding biometric scanning units of the screen is not stored.

By the above method, the biometric scanning unit of a full-screen can be driven. However, only obtain and record the photosensitive image obtained by the corresponding biometric scanning unit of the screen.

In some embodiments of the present disclosure performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) In accordance with the position information, the drive circuit of the corresponding biometric scanning unit is driven for driving the light emitting component and the photosensitive component;

2) The photosensitive component receives a reflected light signal to obtain a photosensitive image;
3) The photosensitive image or the scanning result obtained by the biometric scanning units of the screen is stored.

By the above method, the specific biometric scanning unit can be driven, and the photosensitive image obtained by the biometric scanning unit of the screen of a specific location is obtained and recorded.

In some embodiments of the present disclosure, the biometric scanning unit corresponding to rows of the screen is driven independently. The present disclosure performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to rows of the screen is driven for driving the light emitting component and the photosensitive component;
2) The photosensitive component receives a reflected light signal to obtain a photosensitive image;
3) The photosensitive image or the scanning result obtained by the biometric scanning unit of the screen corresponding to the row and not corresponding to the column is not stored.

Figure 4:
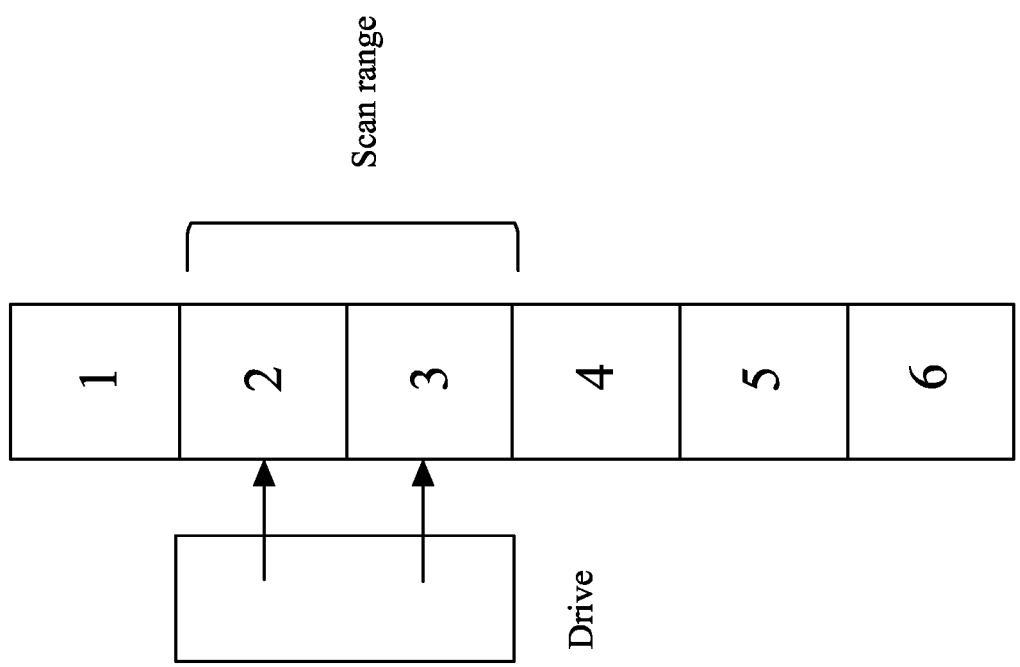
FIG. 4 illustrates a schematic diagram of the biometric feature unit driven with an embodiment of the present disclosure, and the biometric feature unit corresponds to rows of a screen.

As shown in FIG. 2 and FIG. 4, when only the columns 1 and 2 of the rows 2 and 3 are detected to have the touch action, the biometric scanning units corresponding to rows 2 and 3 is driven by the drive circuit. In subsequent processing, only a scan result of the columns 1 and 2 of the rows 2 and 3 are stored, and a scan result of columns 3, 4, and 5 are discarded. By the above method, the biometric scanning unit corresponding to the row of the screen can be only driven and save energy. At the same time, only the photosensitive image obtained by the biometric scanning unit of the screen corresponding to the column is obtained and recorded. It also saves system computing resources and improves computing efficiency.

In some embodiments of the present disclosure, the biometric scanning unit corresponding to columns of the screen is driven independently. The present disclosure performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to columns of the screen is driven for driving the light emitting component and the photosensitive component;
2) The photosensitive component receives a reflected light signal to obtain a photosensitive image;
3) The photosensitive image or the scanning result obtained by the biometric scanning unit of the screen corresponding to the columns and not corresponding to the row is not stored.

As shown in FIG. 2 and FIG. 4, when only the columns 1 and 2 of the rows 2 and 3 are detected to have the touch action, the biometric scanning units corresponding to columns 1 and 2 is driven by the drive circuit. In subsequent processing, only a scan result of the columns 1 and 2 of the rows 2 and 3 are stored, and a scan result of rows 1, 4, and 5 are discarded. By the above method, the biometric scanning unit corresponding to the column of the screen can be only driven in order to save energy. At the same time, only the photosensitive image obtained by the biometric scanning unit of the screen corresponding to the row is obtained and recorded. It also saves system computing resources and improves computing efficiency.

In some embodiments of the present disclosure, the biometric scanning unit can be driven independently. The present disclosure performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to columns of the screen is driven for driving the light emitting component and the photosensitive component;
2) The photosensitive component receives a reflected light signal to obtain a photosensitive image;
3) The photosensitive image or the scanning result obtained by the biometric scanning unit of the screen corresponding to the columns and not corresponding to the row is not stored.

As shown in FIG. 2 and FIG. 3, when only the columns 1 and 2 of the rows 2 and 3 are detected to have the touch action, driving the biometric scanning units corresponding to rows 2 and 3 is by the drive circuit. The biometric scanning units corresponding to coordinates (2, 1), coordinates (2, 2), coordinates (3, 1) and coordinates (3, 2) are driven in order. Therefore, the photosensitive image obtained is stored and subsequently processed. By the above method, driving the corresponding specific biometric scanning unit in order is save energy. At the same time, only the photosensitive image obtained by the partial biometric scanning units of the screen is obtained and recorded. It also saves system computing resources and improves computing efficiency. The sequential driving method can also facilitate the extraction of information.

In some embodiments of the present disclosure, the biometric scanning unit can be driven independently and performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to rows and columns of the screen is driven for driving the light emitting component and the photosensitive component;
2) The photosensitive component receives a reflected light signal to obtain a photosensitive image;
3) In accordance with the position information, the photosensitive image or the scanning result obtained by the non-corresponding biometric scanning units of the screen is not stored.

By the above method, the biometric scanning unit of the cross-shaped area that is in the same row and column to the position information of the touch action can be driven in order to save energy. However, only the photosensitive image obtained by the biometric scanning units of the screen corresponding to the position information is obtained and recorded. It also saves system computing resources and improves computing efficiency.

Figure 5:
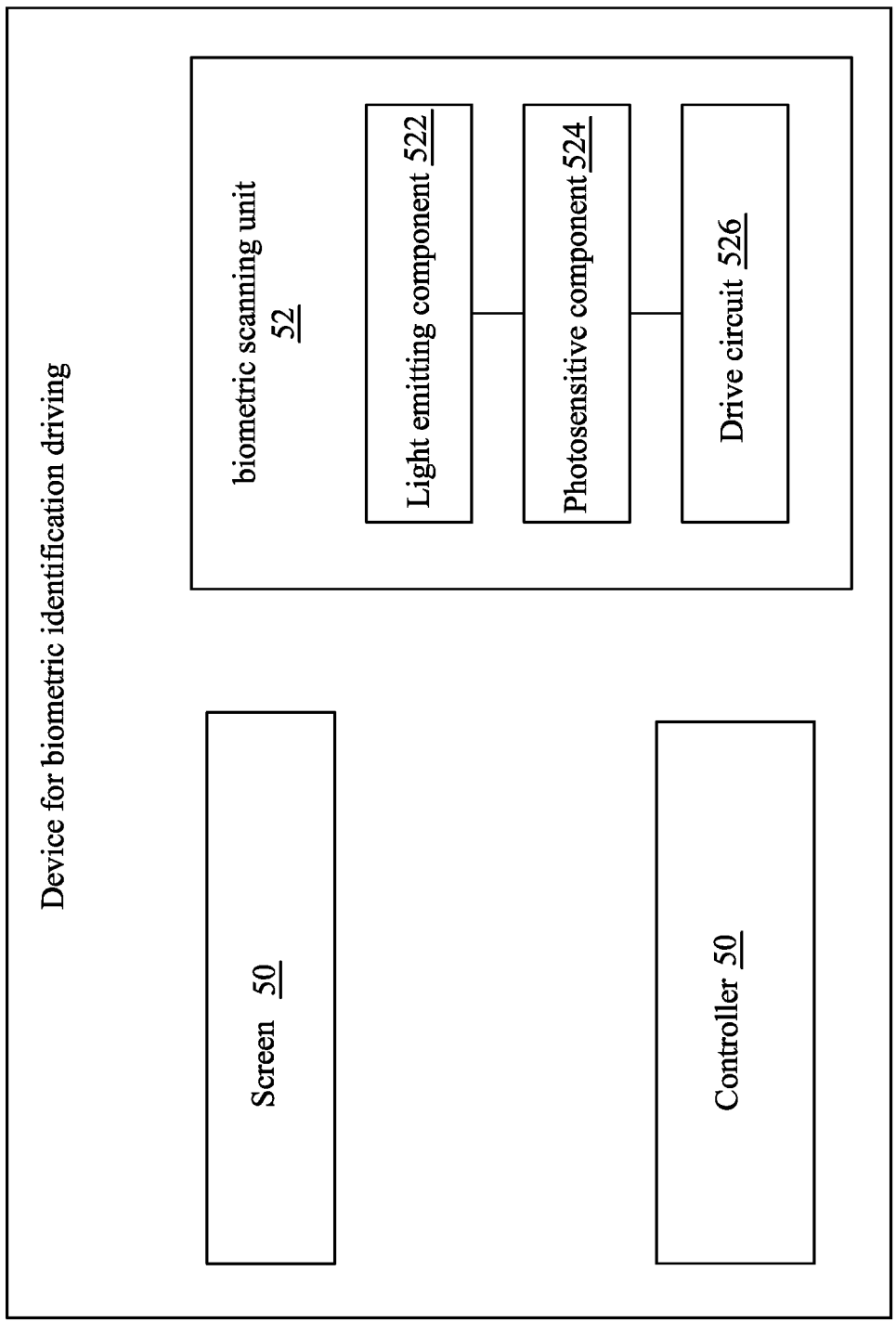
FIG. 5 illustrates a block diagram of a device for biometric identification driving with an embodiment of the present disclosure.

In the embodiment shown in FIG. 5, a device for biometric identification driving is provided, and the device for biometric identification driving includes a screen 50 and a biometric scanning unit 52. The biometric scanning unit 52 includes a light emitting component 522, a photosensitive component 524 and a drive circuit 526. The device for biometric identification driving further includes the storage media for biometric identification driving (Not shown in the figure) and reads a programmable logic controller operating the storage media for biometric identification driving. The above method for biometric identification driving can be executed by the device for biometric identification driving.

In some embodiments of the present disclosure, the device for biometric identification driving is configured to perform the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:
1) All drive circuits of the corresponding biometric scanning unit are driven for driving the light emitting component and the photosensitive component;
2) The photosensitive component receives a reflected light signal to obtain a photosensitive image;
3) In accordance with the position information, the photosensitive image or the scanning result obtained by the non-corresponding biometric scanning units of the screen is not stored.

By the steps of the method performed by the above device, the biometric scanning unit of the full-screen can be driven. However, only obtain and record the photosensitive image obtained by the corresponding biometric scanning unit of the screen.

In some embodiments of the present disclosure, the device for biometric identification driving is further configured to perform the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:
1) In accordance with the position information, the drive circuit of the corresponding biometric scanning unit is driven for driving the light emitting component and the photosensitive component;
2) The photosensitive component receives a reflected light signal to obtain a photosensitive image;
3) The photosensitive image or the scanning result obtained by the biometric scanning units of the screen is stored.

By the method performed by above device, the specific biometric scanning unit can be driven, the photosensitive image obtained by the biometric scanning unit of the screen of a specific location is obtained and recorded.

In some embodiments of the present disclosure, the biometric scanning unit of the device for biometric identification driving corresponding to rows of the screen is driven independently. The device for biometric identification driving is configured to perform the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:
1) The drive circuit of the biometric scanning unit corresponding to rows of the screen is driven for driving the light emitting component and the photosensitive component;
2) The photosensitive component receives a reflected light signal to obtain a photosensitive image;
3) The photosensitive image or the scanning result obtained by the biometric scanning unit of the screen corresponding to the row and not corresponding to the column is not stored.

As shown in FIG. 2 and FIG. 4, when only the columns 1 and 2 of the rows 2 and 3 are detected to have the touch action, the biometric scanning units corresponding to rows 2 and 3 is driven by the drive circuit. In subsequent processing, only a scan result of the columns 1 and 2 of the rows 2 and 3 are stored, and a scan result of columns 3, 4, and 5 are discarded. By the steps of the above method performed by the above device, the biometric scanning unit corresponding to the row of the screen can be only driven in order to save energy. At the same time, only the photosensitive image obtained by the biometric scanning unit of the screen corresponding to the column is obtained and recorded. It also saves system computing resources and improves computing efficiency.

In some embodiments of the present disclosure, the biometric scanning unit corresponding to columns of the screen is driven independently. By the device for biometric identification driving performing the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:
1) The drive circuit of the biometric scanning unit corresponding to columns of the screen is driven for driving the light emitting component and the photosensitive component;
2) The photosensitive component receives a reflected light signal to obtain a photosensitive image;
3) The photosensitive image or the scanning result obtained by the biometric scanning unit of the screen corresponding to the row and not corresponding to the column is not stored.

As shown in FIG. 2 and FIG. 4, when only the columns 1 and 2 of the rows 2 and 3 are detected to have the touch action, the biometric scanning units corresponding to columns 1 and 2 is driven by the drive circuit. In subsequent processing, only a scan result of the columns 1 and 2 of the rows 2 and 3 are stored, and a scan result of rows 1, 4, and 5 are discarded. By the device for biometric identification driving performing the steps of the method, the biometric scanning unit corresponding to the column of the screen can be only driven in order to save energy. At the same time, only the photosensitive image obtained by the biometric scanning unit of the screen corresponding to the row is obtained and recorded. It also saves system computing resources and improves computing efficiency.

In some embodiments of the present disclosure, the biometric scanning unit can be driven independently and performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to the position information is driven in order. For example, driving the light emitting component or the photosensitive component is from left to right and from top to bottom;
2) The photosensitive component receives a reflected light signal to obtain a photosensitive image;
3) The photosensitive image or the scanning result obtained by the biometric scanning units of the screen is stored.

As shown in FIG. 2 and FIG. 4, when only the columns 1 and 2 of the rows 2 and 3 are detected to have the touch action, the biometric scanning units corresponding to rows 2 and 3 is driven by the drive circuit. Driving the biometric scanning unit corresponding to coordinates (2, 1), coordinates (2, 2), coordinates (3, 1) and coordinates (3, 2) is in order. Therefore, the photosensitive image obtained is stored and subsequently processed. By the above device performing the steps of the above method, driving the corresponding specific biometric scanning unit in order is save energy. At the same time, only the photosensitive image obtained by the partial biometric scanning units of the screen is obtained and recorded. It also saves system computing resources and improves computing efficiency. The sequential driving method can also facilitate the extraction of information.

In some embodiments of the present disclosure, the biometric scanning unit can be driven independently, and the device further performs the following steps. In step S300, a touch action of a living organism is detected on a screen. In step S302, a position information of the touch action is obtained on the screen. In step S304, a scanning data of a corresponding biometric scanning unit of the screen is obtained according to the position information of the touch action on the screen. More detailed steps are as follows:

1) The drive circuit of the biometric scanning unit corresponding to rows and columns of the screen is driven for driving the light emitting component and the photosensitive component;
2) The photosensitive component receives a reflected light signal to obtain a photosensitive image;
3) In accordance with the position information, the photosensitive image or the scanning result obtained by the non-corresponding biometric scanning units of the screen is not stored.

By the above device performing the steps of the method, the biometric scanning unit of the cross-shaped area that is in the same row and column to the position information of the touch action can be driven in order to save energy. However, only the photosensitive image obtained by the biometric scanning units of the screen corresponding to the position information is obtained and recorded. It also saves system computing resources and improves computing efficiency.

A storage media for biometric identification driving is provided in the present disclosure, and the storage media for biometric identification driving stores a computer program. When the computer program is executed, the computer program performs the following steps. First, a touch action of a living organism is detected on a screen. Next, a position information of the touch action is obtained on the screen. Next, a scanning data of a corresponding biometric scanning unit of the screen is obtained according to the position information of the touch action on the screen.

In some embodiment, when the computer program is executed, the computer program further performs the step of driving the corresponding biometric scanning unit of the screen according to the position information of the touch action on the screen.

In some embodiment, when the computer program is executed, the computer program further performs the step of driving the corresponding biometric scanning unit of the screen in order.

In some embodiment, the biometric scanning unit corresponding to rows of the screen is driven independently, and when the computer program is executed, the computer program further performs the step of driving the biometric scanning unit of the screen corresponding to the row according to the position information of the touch action on the screen.

In some embodiment, the biometric scanning unit corresponding to columns of the screen is driven independently, and when the computer program is executed, the computer program further performs the step of driving the biometric scanning unit of the screen corresponding to the column is according to the position information of the touch action on the screen.

In some embodiment, when the computer program is executed, the computer program further performs the steps of discarding a non-corresponding biometric scan result is according to the position information of the touch action on the screen.

Although the above embodiments have been described, those skilled in the art can make other changes and modifications to these embodiments once they have learned the basic inventive concept. Therefore, the above descriptions are only the embodiments of the present disclosure, and thus does not limit the patent protective scope of the present disclosure. Similarly, any equivalent structure or equivalent process transformation made by using the present specification and the drawings, or directly or indirectly applied to other relevant technical fields, shall be included in the patent protective scope of the present disclosure.

What is claimed is:

1. A method for biometric identification driving comprising:
   detecting a touch action of a living organism on a screen;
   obtaining a position information of the touch action on the screen;
   driving the corresponding biometric scanning unit of the screen according to the position information of the touch action on the screen;
   obtaining a scanning data of a corresponding biometric scanning unit of the screen according to the position information of the touch action on the screen; and
   discarding a non-corresponding biometric scan result obtained by the biometric scanning unit according to the position information of the touch action on the screen;
   wherein the non-corresponding biometric scan result is not corresponding to the position information;
   wherein the biometric scanning unit corresponding to rows of the screen is driven independently, the method for biometric identification driving further comprises: driving the biometric scanning unit of the screen corresponding to a row according to the position information of the touch action on the screen; wherein discarding a non-corresponding biometric scan result according to the position information of the touch action on the screen comprises: discarding the biometric scanning result obtained by the biometric scanning unit of the screen corresponding to the row but not corresponding to a column of the position information; or wherein the biometric scanning unit corresponding to columns of the screen is driven independently, the method for biometric identification driving further comprises:

driving the biometric scanning unit of the screen corresponding to a column according to the position information of the touch action on the screen; wherein discarding a non-corresponding biometric scan result according to the position information of the touch action on the screen comprises: discarding the biometric scanning result obtained by the biometric scanning unit of the screen corresponding to the column but not corresponding to a row of the position information.

2. The method for biometric identification driving of claim 1, further comprising: driving the corresponding biometric scanning unit of the screen in order.

3. The method for biometric identification driving of claim 1 wherein the biometric scanning unit comprises a light emitting component, a photosensitive component and a drive circuit.

4. The method for biometric identification driving of claim 1 wherein the screen is a touch screen or a display screen.

5. The method for biometric identification driving of claim 1 further comprising driving all biometric scanning units.

6. A storage device for biometric identification driving storing a computer program;

wherein when the computer program is executed, the computer program performs:
detecting a touch action of a living organism on a screen;
obtaining a position information of the touch action on the screen;
driving the corresponding biometric scanning unit of the screen according to the position information of the touch action on the screen;
obtaining a scanning data of a corresponding biometric scanning unit of the screen according to the position information of the touch action on the screen;

wherein when the computer program is executed, the computer program further performs a step of discarding a non-corresponding biometric scan result obtained by the biometric scanning unit according to the position information of the touch action on the screen;

wherein the non-corresponding biometric scan result is not corresponding to the position information;

wherein the biometric scanning unit corresponding to rows of the screen is driven independently, when the computer program is executed, the computer program further performs a step of driving the biometric scanning unit of the screen corresponding to a row according to the position information of the touch action on the screen; wherein discarding a non-corresponding biometric scan result according to the position information of the touch action on the screen comprises: discarding the biometric scanning result obtained by the biometric scanning unit of the screen corresponding to the row but not corresponding to a column of the position information; or wherein the biometric scanning unit corresponding to columns of the screen is driven independently, when the computer program is executed, the computer program further performs a step of driving the biometric scanning unit of the screen corresponding to a column according to the position information of the touch action on the screen, wherein discarding a non-corresponding biometric scan result according to the position information of the touch action on the screen comprises: discarding the biometric scanning result obtained by the biometric scanning unit of the screen corresponding to the column but not corresponding to a row of the position information.

7. The storage device for biometric identification driving of claim 6 wherein when the computer program is executed, the computer program further performs a step of driving the corresponding biometric scanning unit of the screen in order.

8. A device for biometric identification driving comprising:
a screen;
a biometric scanning unit; and
a storage device for biometric identification driving of claim 6.

* * * * *